(12) United States Patent
Manken et al.

(10) Patent No.: US 7,922,616 B2
(45) Date of Patent: Apr. 12, 2011

(54) APPARATUS FOR CONTROLLING A HYBRID DRIVE SYSTEM FOR A MOTOR VEHICLE, AN INDUSTRIAL TRUCK IN PARTICULAR

(75) Inventors: Frank Manken, Henstedt-Ulzburg (DE); Andreas Rogg, Lubeck (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 603 days.

(21) Appl. No.: 11/861,365

(22) Filed: Sep. 26, 2007

(65) Prior Publication Data

US 2008/0076622 A1 Mar. 27, 2008

(30) Foreign Application Priority Data

Sep. 27, 2006 (DE) .................. 10 2006 045 502

(51) Int. Cl.
B60K 1/02 (2006.01)
B60W 10/06 (2006.01)
B60W 10/04 (2006.01)
(52) U.S. Cl. ............... 477/3; 180/65.28; 180/65.285
(58) Field of Classification Search .............. 477/3, 5; 180/65.265, 65.275, 65.28, 65.285
See application file for complete search history.

(56) References Cited

U.S. PATENT DOCUMENTS

| 3,566,717 | A | 3/1971 | Berman et al. | |
|---|---|---|---|---|
| 6,921,984 | B2 | 7/2005 | Rogg | |
| 7,721,833 | B2 * | 5/2010 | Kikuchi | 180/65.28 |
| 2002/0094908 | A1 * | 7/2002 | Urasawa et al. | 477/3 |
| 2006/0289211 | A1 * | 12/2006 | Mashiki | 180/65.2 |
| 2008/0018111 | A1 * | 1/2008 | Yaguchi | 290/40 B |

FOREIGN PATENT DOCUMENTS

| DE | 102 49 084 A1 | 7/2003 |
|---|---|---|
| DE | 199 55 311 C2 | 12/2003 |
| DE | 103 40 472 A1 | 9/2005 |
| EP | 0 867 323 A2 | 11/2007 |
| JP | 11343891 A * | 12/1999 |
| JP | 2001310654 A * | 11/2001 |

* cited by examiner

Primary Examiner — Roger Pang
(74) Attorney, Agent, or Firm — Vidas, Arrett & Steinkraus (57) ABSTRACT

An apparatus for controlling a hybrid drive system for a motor vehicle, an industrial truck in particular, with an internal combustion engine BKM, an accumulator for electric energy, an apparatus for acquiring the charge condition SOC of the accumulator, at least one electric engine E1/E2, which is connectable to the electric accumulator, and at least one gearbox arrangement, via which the internal combustion engine BKM, the electric engine E1/E2 and at least one wheel of the vehicle can be coupled to each other, with the following features: a desired value transmitter for the travelling speed v, an actual value transmitter for the travelling speed v, a first controlling device for the travelling speed v, and a speed controller for the desired wheel torque; a torque calculation stage, which establishes the desired torque values for the internal combustion engine BKM as well as the desired values for the electric engine E1/E2 from the desired driving torque M-soll or a signal corresponding to the same, a second controlling device, which drives the internal combustion engine BKM such that the deviations become sufficiently small, and a third controlling device, which drives the electric engine E/1/E2 such that the deviations become sufficiently small.

30 Claims, 7 Drawing Sheets

APPARATUS FOR CONTROLLING A HYBRID DRIVE SYSTEM FOR A MOTOR VEHICLE, AN INDUSTRIAL TRUCK IN PARTICULAR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Hybrid drives are known since a long time. Typically, they contain an internal combustion engine and at least one electric motor, which work in series or parallel on one driving shaft. For the coupling of the drive engines, a gearbox arrangement is necessary, mostly a superimposition gear and a cross gear set.

From U.S. Pat. No. 3,566,717, the entire contents of which is incorporated herein by reference, a drive system with an internal combustion engine as primary driving engine, and a gearbox with electric power branching is known. The signal preset by the operator is analysed as a desired torque on the driving wheel. The electric engine is controlled such that the electric engine runs with constant rotational speed even at variable load.

From EP 0 867 323, the entire contents of which is incorporated herein by reference, a method for the operation of a hybrid drive system has become known, in which the pedal position preset by the driver is interpreted as desired power on the driving wheel. The desired wheel torque is determined from a characteristic diagram, as a function of the pedal value (driver's desired torque) and of the actual travelling speed. With the actual travelling speed, the desired driving power is determined from the desired wheel torque. A consumption-favourable combination of torque and rotational speed, which satisfies the desired driving power, is read out from a previously fixed torque/rotational speed characteristic curve of the internal combustion engine. In this method, it is disadvantageous that the driver has to control the travelling speed himself, by presetting the torque or the power on the wheel, respectively.

The present invention is based on the objective to provide an apparatus for controlling a hybrid drive system for a motor vehicle, an industrial truck in particular, which minimises the fuel consumption and provides that internal combustion engine and electric engine are only charged with permitted torques. In addition, the travelling behaviour of the vehicle is to be improved,

BRIEF SUMMARY OF THE INVENTION

In the apparatus of the present invention, the desired value transmitter presets a desired-signal for the travelling speed. At option, a rotational speed presetting can be provided, when the gearbox arrangement establishes a predetermined relation between speed presetting and wheel rotational speed. A first controlling device compares the desired value of the travelling speed with the actual value and establishes a desired wheel torque from this. Alternatively, a desired driving force or a desired driving power may also be determined. A torque calculation stage is topped by the first controlling device, which establishes the desired torque values for the internal combustion engine as well as the desired values for the at least one electric motor from the desired driving torque or a signal corresponding to the same, the kinematic conditions of the gearbox arrangement and the actual rotational speed of the electric engine needed for this, and/or the travelling speed. The "corresponding signal" is in a formulaic relation with the desired driving torque. A first characteristic curve stage with at least one characteristic curve associates approximately optimum rotational speeds to the desired torque values of the internal combustion engine, through which a desired-signal for the rotational speed of the internal combustion engine is obtained. A second controlling device performs a comparison of the desired and the actual values of the rotational speed of the internal combustion engine and drives the same such that the deviations become sufficiently small. A third controlling device compares desired and actual values of the torques and also currents, respectively, of the electric engine and drives the same such that the deviations become sufficiently small.

In the apparatus of the present invention, the drive system may have different constellations of the power and gearing parts. For instance, one of them may be that the gearbox arrangement has at least one changeover or variable speed gearbox, the input of which is coupled with the driven shaft of the internal combustion engine and the output of which is coupled with the driven shaft of the drive system. At least one first cross gear set is provided, the inputs of which are coupled with the driven shaft of the changeover or variable speed gearbox and the driven shaft of the electric engine, and the output of which is coupled with the driven shaft of the drive system. Alternatively, at least one first cross gear set is provided, the inputs of which are coupled with the driven shaft of the internal combustion engine and the driven shaft of the electric engine, and the output of which is coupled with the driven shaft of the drive system. At least one changeover or variable speed gearbox is provided in the train of the driven shaft.

Finally, in a third alternative, at least one first cross gear set may be provided, the input of which is coupled with the driven shaft of the internal combustion engine and the driven shaft of a first electric engine, and the output of which is coupled with the driven shaft of the drive system. At least one changeover or variable speed gearbox is coupled with its input with the driven shaft of the first cross gear set. A second cross gear set is provided, the inputs of which are coupled with the driven shaft of the changeover or variable speed gearbox and the driven shaft of a second electric engine. The output thereof is coupled with the driven shaft of the drive system. The mentioned first characteristic curve stage assigns optimum rotational speeds for the internal combustion engine to the desired torque values from the torque calculation stage. The first characteristic curve stage can have a further characteristic curve, which assigns desired rotational speeds of the internal combustion engine to the desired values of the travelling speed, wherein the desired rotational speed values for the internal combustion engine, determined from the individual characteristic curves, are linked with each other in order to establish a desired rotational speed value for the internal combustion engine. The linking can be an addition of the two values.

The first characteristic curve stage can have at least one set of characteristic curves, which assigns optimum rotational speeds to value-pairs of travel speed desired values and torque desired values of the internal combustion engine, in order to create a desired rotational speed of the internal combustion engine. A diagram of the rotational speed/torque/efficiency for the electric engine E1/E2 can also be stored in the first characteristic curve stage, which is taken into account when establishing the rotational speed desired values for the internal combustion engine. In addition, the first characteristic curve stage may contain a characteristic diagram of the rotational speed/torque/efficiency for the changeover or variable speed gearbox, which is taken into account when establishing the rotational speed desired values for the internal combustion engine.

Consumption values of the internal combustion engine can be assigned to the value pairs of desired wheel torque and desired travelling speed, so that the characteristic curve stage can output a signal for the momentary consumption which is to be expected. One set of characteristic curves may be provided for each different mode of operation. The signal of the momentary consumption may be consulted by an operation strategy stage for the decision of the change-over between the modes of operation. Additional desired or actual variables can be consulted for the establishment of the desired rotational speed values of the internal combustion engine.

A so-called ramp generator can be connected between the desired value transmitter and the first controlling device, which limits the dynamics of the desired-signal or changes over to the first controlling device according to a preset characteristic curve.

In a further embodiment of the present invention, a second characteristic curve stage may be provided, in which at least one torque/rotational speed characteristic curve of the internal combustion engine is stored for establishing a possible output torque of the internal combustion engine from the actual rotational speed value of the internal combustion engine under consideration of the comparison of desired and actual rotational speed of the internal combustion engine and the inertia thereof. As is known, the internal combustion engine BKM has a considerable inertia, above all when there is a flywheel, through which there is a transition time between presetting of an input signal by the controller and reaching the desired rotational speed.

At plural characteristic curves in the first and/or second characteristic curve stage, a switchover between the characteristic curves may be provided. This switchover can be triggered manually through the travelling speed signal of the desired value transmitter, and/or automatically by the actuation speed thereof.

The torque calculation stage can have a series of substages. In one substage, the desired torque for the electric engine is established and/or limited, which is connected to an constrained system cross gear set or to a bridged superimposition gear, by establishing the desired torque of the electric engine such that the output torque of the gearbox takes the value necessary to satisfy the wheel torque, wherein the possible output torque of the internal combustion engine is taken into account, which is established in the second characteristic curve stage. In the calculation of the desired torques of the electric engine, the efficiency thereof as well as the fact that the torques change with the rotational speed (rotational speed/torque characteristic curve) can also be taken into consideration.

Alternatively, in the substage the desired torque can be established and/or limited for the electric engine, which is connected to a superimposition gear. The desired torque of the electric engine is established such that the internal combustion engine, connected to the gearbox input, is loaded only up to the possible output torque of the internal combustion engine, which is established in the second characteristic curve stage.

In another embodiment, in one substage, the desired torques of the electric engine, connected to a first constrained system cross gear set, and those of the second electric engine, connected to a second constrained system cross gear set, are established and/or limited, when the changeover or variable speed gearbox, arranged between the cross gear sets, is switched to be neutral. The electric power generated by the first electric engine in the generator mode is consumed in a series mode by the second electric engine, and the internal combustion engine connected to the first cross gear set is loaded only up to the possible output torque of the internal combustion engine, which is established in the second characteristic curve stage.

Finally, in one substage of the torque calculation stage, the desired torque for one electric engine can be established and/or limited, which is connected to a constrained system cross gear set or a bridged superimposition gear, by determining the desired torque of the electric engine such that the entire output torque of the gearbox is generated by the electric engine only and it takes on the value necessary to satisfy the wheel torque.

The operation of the electric engine is also determined by the charging condition of the accumulator. When the accumulator is almost discharged, it is not possible to use the electric engine for the production of a part of the driving torque of the vehicle. On the contrary, the electric engine cannot be used for charging the accumulator, when the accumulator is essentially completely charged. Therefore, one embodiment of the present invention provides that an apparatus for detecting the charging condition is provided, and the signal of the apparatus presets the permitted charging or discharging power of the electric accumulator. Practically, this signal is input into the torque calculation stage.

For the calculation of the desired torques for the electric engine, the charging- and discharging power of the electric accumulator can be divided into a value for the continuous power and a value for a short-time power. The compensation of the difference of the desired torque and of the possible output torque of the internal combustion engine takes place with the value for a short-time charging- and discharging power.

In the apparatus of the present invention, a fourth characteristic curve stage can be provided, in which at least one torque/rotational speed characteristic curve for an electric engine is stored. The possible output torque of the electric engine can be established from the actual value of the rotational speed of the electric engine, optionally under consideration of the comparison of desired and actual rotational speed of the electric engine and the inertia thereof. In this context, the torque calculation stage can have a second torque limitation stage, which limits the desired torque values of the electric engine to the values established in the fourth characteristic curve stage.

It shall be understood that for the operation of the electric engine in particular, the temperature thereof has an influence on the torque demand to the drive assembly. Therefore, in a further embodiment of the present invention it is proposed that in the second torque limitation stage, the permitted power loss of the electric engine is established by measuring or calculating the actual temperature and by comparing it with a permitted maximum temperature, after which, optionally with a characteristic curve, a limitation factor for the desired torque is established there from and the permitted desired torque for the electric engine is correspondingly limited.

According to another embodiment of the present invention, it is provided that in the first characteristic curve stage desired rotational speeds for a first or second electric engine are established, the torque of the internal combustion engine is controlled in the second controlling device and the rotational speed of the one as well as the torque of the other electric engine is controlled in the third controlling device.

According to another embodiment of the present invention, a mode of operation changing stage for bridging a superimposition gear can be provided, and a fifth controlling or regulating device controls the actuation of the switching elements of the bridging apparatus. The mode of operation of the changing stage can be dimensioned for releasing or closing of clutches or brakes, and a controlling- or regulating device controls the actuation of the switching elements of the clutches or brakes. Furthermore, the mode of operation of the changing stage can switch the drive system into a series operation by actuation of clutches and brakes, in which the power generated by the internal combustion engine is electrically transmitted from the first electric engine, which works as a generator, to the second electric engine, which works as a travelling motor.

The mode of operation changing stage can switch the drive system into a power-branched operation through the actuation of clutches and brakes, in which a part of the power generated by the internal combustion engine is electrically transferred from the first electric engine, which works as a generator or motor, respectively, to the second electric engine, which works as a motor or generator. The other part of the power is mechanically transferred to the driven shaft of the drive system via the gearbox shafts.

The mode of operation changing stage can switch the drive system into a parallel operation through the actuation of clutches and brakes, in which the powers generated by the internal combustion engine and by at least one electric engine sum up.

Further, the mode of operation changing stage can switch the drive system into a purely electric operation through the actuation of clutches and brakes, in which the internal combustion engine can be cut off.

Different controllers, characteristic curve stages and torque calculation stages can be provided for the various modes of operation. Finally, an operation strategy stage can be provided, which determines the most advantageous mode of operation for the actual operating state from input signals, and drives the subsequent mode of operation changing stage. In order to achieve a shock-free transition from one mode of operation into the other, the desired value for the rotational speed of the internal combustion engine can be correspondingly changed.

The operation strategy stage can detect and compare the energy consumption in the individual modes of operation and generate desired-signals for the mode of operation changing stage, in order to change over into the most favourable mode of operation. Hystereses can be provided in order to avoid pendulum circuits. Consumption values of the internal combustion engine BKM can be assigned to the value pairs of desired wheel torque and desired travelling speed, through which the characteristic curve stage can output a signal of the momentary consumption to be expected. One characteristic curve stage can be provided for each one of the different modes of operation. The signal of the momentary consumption can be consulted for the decision of the changeover between the modes of operation by the operation strategy stage. Depending on mode of operation and charging condition of the accumulator, it is decided whether the accumulator is charged or discharged. This takes place according to the third characteristic curve stage.

The drive system of the present invention can also be used for the drive in a pump for a hydraulic system in the vehicle, an industrial truck in particular. With an operational control for presetting the desired speed of a working function (lifting speed, for instance), a signal is obtained, which establishes a desired rotational speed value for the internal combustion engine in a calculation stage with the kinematic conditions of the gearbox and the actual rotational numbers of the electric engine. In a maximum value stage, the greater one of the two desired rotational speed values for the travelling function and the working function can be established and can be forwarded to the controlling device for the rotational speed of the internal combustion engine. Purely electromotoric lifting is also possible.

The apparatus of the present invention serves for the control of a drive system from an internal combustion engine and one or plural electric engines. It has a travelling speed control loop, a characteristic curve stage for establishing the desired rotational speed of the internal combustion engine and a stage for the calculation of a desired torque. The electric engine E1/E2 can be connected to a constraint system gearbox or a superimposition gear, or work in a series mode. With the aid of the apparatus of the present invention, it is possible to control a hybrid drive such that the fuel consumption is minimised and the internal combustion engine and the electric engine are only operated at permitted torques.

BRIEF DESCRIPTION OF THE SEVERAL VIEWS OF THE DRAWINGS

Examples of the invention's realisation are explained in more detail by means of drawings in the following.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In FIG. 1, a hybrid drive system, for an industrial truck for instance, is schematically depicted. It contains an internal combustion engine BKM and an electric engine E1. The electric engine works towards a cross gear set 1, which is coupled to the output of a changeover or variable speed gearbox 2, which on its part is coupled to the shaft of the internal combustion engine BKM. The electric engine E1 is supplied by an electric accumulator 4a. The charging condition SOC thereof is acquired by a device 3, whose output signal reaches a controlling and regulating device for the hybrid drive. The controlling and regulating device controls and regulates, respectively, the internal combustion engine BKM and the electric motor 1 via a BKM control device and an electric engine control device. A desired value transmitter 4, which is formed by a pedal of the vehicle, for instance, generates a desired value for the speed v of the vehicle.

Figure 1:
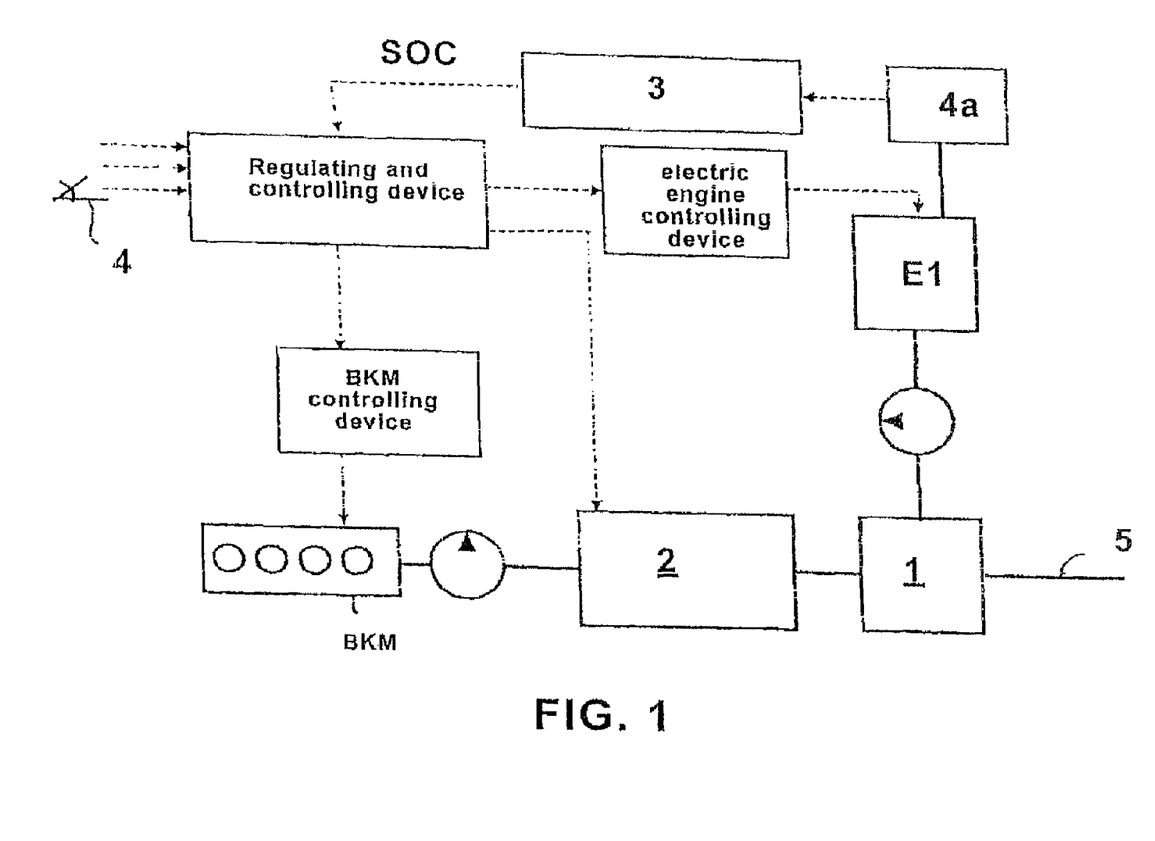
FIG. 1 shows a connection diagram of an example of the application of an apparatus of the present invention.
Figure 2:
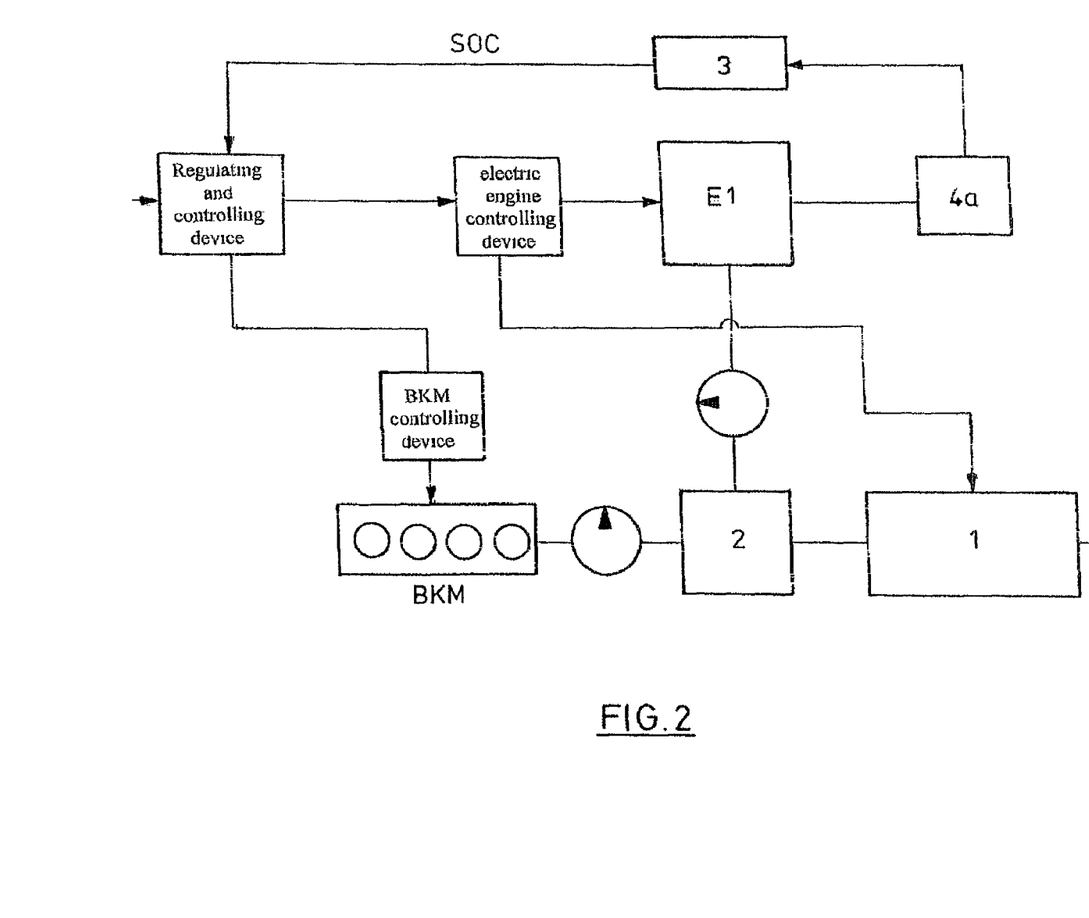
FIG. 2 shows a connection diagram of a second example of the application of an apparatus of the present invention.

The embodiment of FIG. 2 differs from that one of FIG. 1 through that electric engine E1 as well as internal combustion engine BKM are coupled to the cross gear set 2, the output of which is coupled with the changeover or variable speed gearbox 1 which is coupled with the driven shaft 5 of the drive system.

Figure 3:
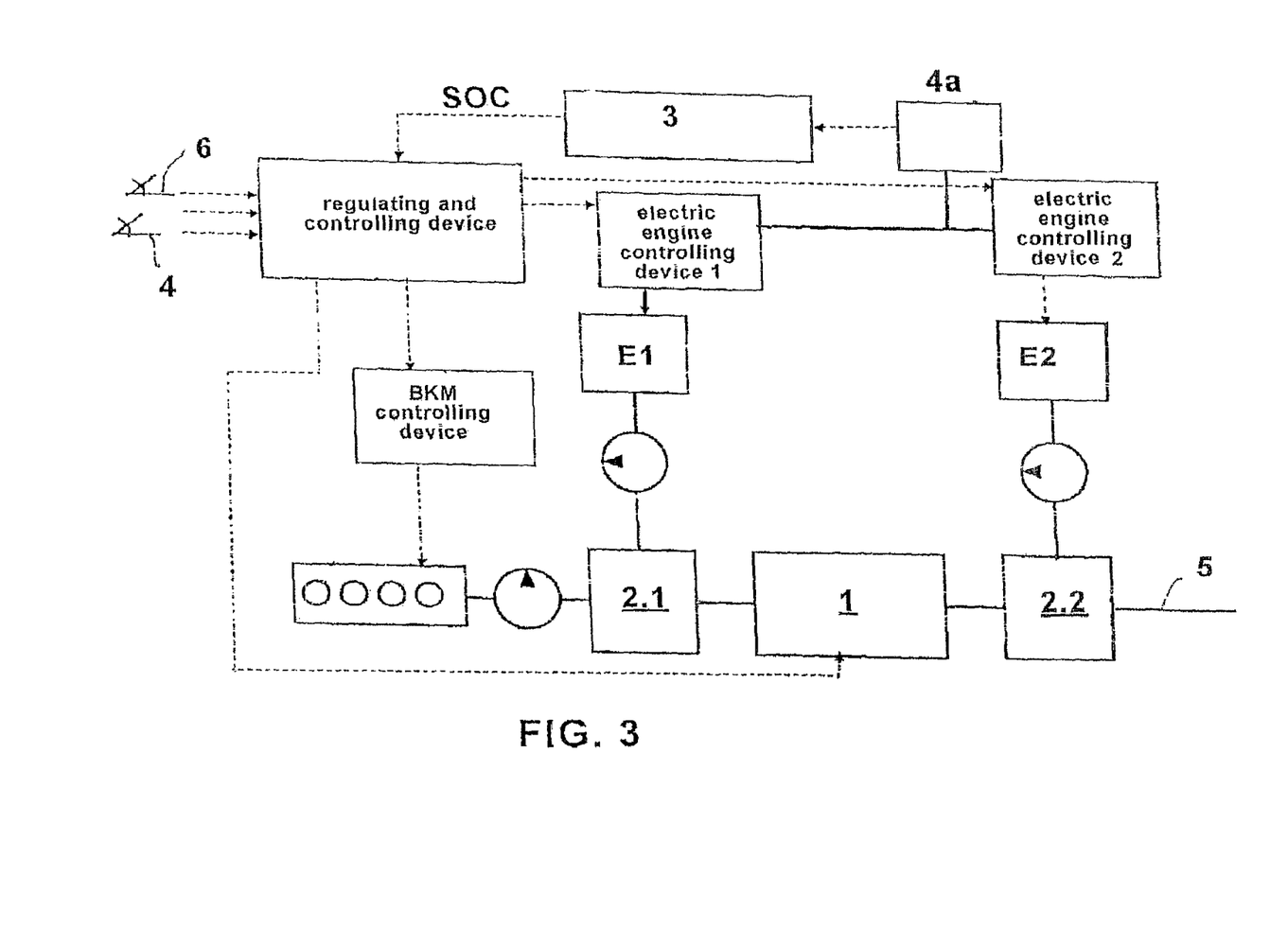
FIG. 3 shows a connection diagram of a third application possibility of the apparatus of the present invention.

The embodiment of FIG. 3 differs from that one of FIG. 2 through that two electric engines E1 and E2 are provided, which each one act on a cross gear set 2.1 and 2.2, respectively. The changeover or variable speed gearbox 1 is located between the cross gear sets 2.1 and 2.2. Into the controlling and regulating device comes also the signal of an additional desired value transmitter 6 for a working function, for lifting and lowering of a load accommodation means of the industrial truck, for instance.

In the following, the circuit diagram of FIG. 4 will be explained. As mentioned, with the desired value transmitter or pedal 4, respectively, a desired value for the speed v is preset for the vehicle. It is designated with v-soll-roh. It reaches a ramp generator, in which a jump signal of the pedal is only gradually run up to the final height. This is per se known. This desired value is compared in a desired-actual comparison with the actual speed v-ist, which is generated by a not shown actual value transmitter for the vehicle travelling speed. The deviation reaches a velocity controller (V-controller), which creates a desired moment M-soll. The desired moment goes to a block for torque calculation or torque limitation, respectively, details of which will still be explained later. In the torque calculation, a desired value for the moment of the internal combustion engine BKM is generated, namely M-BKM-soll, which converts this desired value for a rotational speed n1 in a characteristic curve stage.

The desired value v-soll-roh is furthermore converted to a rotational speed signal n2 in a characteristic curve stage. The rotational speed signals n1 and n2 are summed up at 7 to a desired rotational speed value for the internal combustion engine BKM. In the characteristic curve stage, approximately optimum rotational speeds are assigned to the desired torque values of the internal combustion engine BKM by means of a characteristic curve deposited therein. In the second stage of the mentioned characteristic curve stage, in which again at least one characteristic curve is deposited, desired rotational speeds of the internal combustion engine are assigned to the desired values of the travelling speed v-soll-roh. The mentioned rotational speed values are linked at 7 as mentioned and are given up to the rotational speed controller BKM as desired rotational speed values. From an actual value transmitter associated with the internal combustion engine, the actual rotational speed value arrives at a desired/actual value comparison, to which the desired rotational speed value is also given up. The deviation between desired and actual value comes also to a motor model. Here, it is taken into account that the internal combustion engine has an inertia, which appears in a time delay between the presetting of the desired rotational speed value and its reaching. In an additional characteristic curve stage (motor/torque characteristic curve) it is deposited at which actual rotational speeds of the internal combustion engine BKM the maximum torque value is reached. A corresponding limit value M-BKM-Grenz is also given up to the motor model in order to generate a signal M-BKM-begr. corresponding to the respective operating state of the internal combustion engine. This signal is taken into account in the torque calculation for the electric engine as well as the actual value of the speed v-ist and the charging condition SOC of the electric accumulator. In the torque calculation, desired torques for the torque controller for two electric engines E1 and E2 are generated moreover. The controlling device assigned to the internal combustion engine drives the internal combustion engine such that the deviations become sufficiently small. The controlling devices for the electric engines E1 and E2 are driven in the same way, such that the deviations become sufficiently small.

Figure 4:
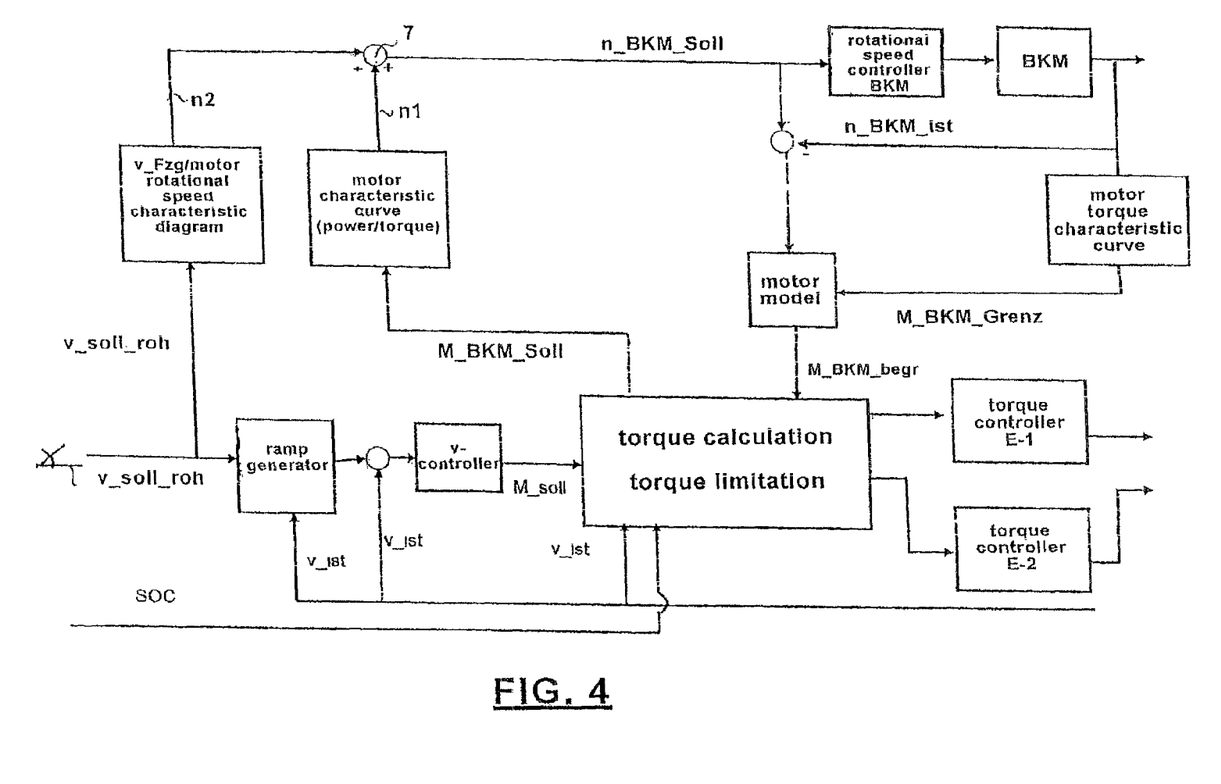
FIG. 4 shows a control diagram for the operation of the embodiments according to FIGS. 1 to 3

As already mentioned, the characteristic curve stage in FIG. 4 serves for the assignment of the desired torque values to optimum rotational speeds. In addition, it is also necessary to take into account the gear ratio of the gearbox arrangement. Naturally, the measured speed is not equal to a certain rotational speed, but it depends on the gear ratio. This is depicted in the left-hand block in FIG. 4 (v-Fzg/motor rotational speed characteristic diagram).

In the calculation of the desired torques, the charging condition SOC of the electric accumulator not shown in FIG. 4 is also of some importance. This is indicated in FIG. 4 thereby that a line (Signal SOC) is connected with the torque calculation.

Figure 6:
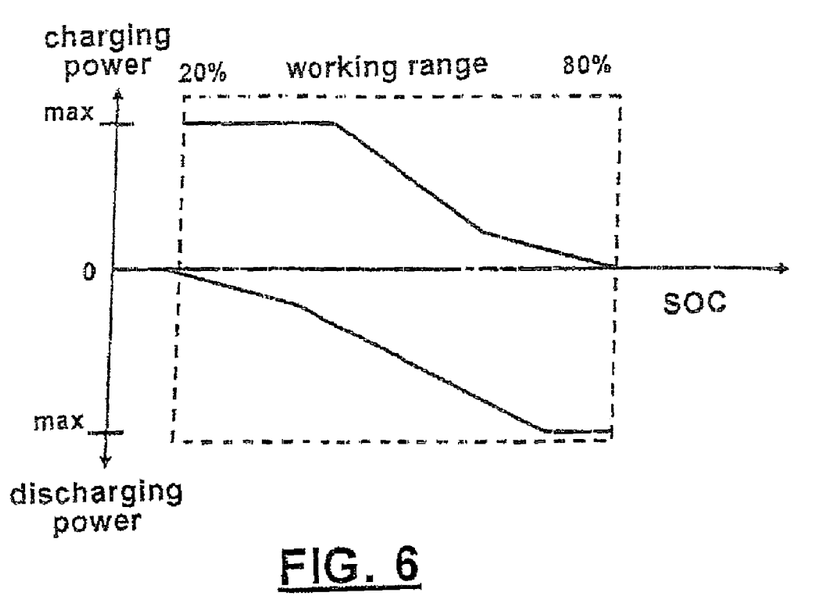
FIG. 6 shows curves for the charging power and the discharging power of an accumulator in the embodiments according to FIGS. 1 to 3.

In FIG. 6, two characteristic curves for charging power and discharging power are drawn. As is known, the optimum working range of usual electric accumulators is between 20% and 80% of the charge. In other words, the accumulator should not be discharged below 20% and not be charged over 80%. This is why the characteristic curves depicted in FIG. 6 are stored in the block torque calculation. When the charging power is at 80%, for instance, the electric engine E1 or E2, respectively, cannot be operated as a generator such that it charges the accumulator. In the contrary, an electric engine cannot be operated as a motor when the charge in the accumulator is still only 20%.

The individual characteristic curve stages can have a plurality of characteristic curves, between which can be switched over. Such a switching-over takes place via a manual presetting, for instance, by using the signal of the desired value transmitter for it, or even automatically, taking into account the signal of the actuation speed driven desired value transmitter.

The torque calculation stage can have a substage, in which the desired torque for the electric engines is established and/or limited, which are connected to a constraint system cross gear set or an bridged superimposition gear, by determining the desired torque of the electric engine E1/E2 such that the output torque of the gearbox functions to let the desired wheel torque take on the needed value, wherein the possible output torque of the internal combustion engine BKM, which is established in the second characteristic curve stage, is taken into account.

The torque calculation stage can have a substage, in which the desired torque for the electric engine E1/E2 is established and/or limited, which is connected to a superimposition gear, wherein the desired torque of the electric engine is determined such that the internal combustion engine BKM connected to the gearbox input is deliberately limited for the possible output torque of the BKM, which is established in the second characteristic curve stage.

The torque calculation stage can have another substage, in which the desired torques of the electric engine connected to a first cross gear set and those of the second electric engine connected to a second cross gear set are determined or limited, when the changeover or variable speed gearbox arranged between the cross gear sets is switched into the neutral position, wherein the electric power generated by the first electric engine as a generator is consumed in a series mode by the second electric engine, and the internal combustion engine connected to the first cross gear set is charged only up to the possible output torque of the BKM, which is established in the second characteristic curve stage.

The torque calculation stage can have a further substage, in which the desired torque for the electric engine E1/E2 is established and/or limited, which is connected to a constraint system cross gear set or an bridged superimposition gear, by determining the desired torque of the electric engine such that the entire output torque of the gearbox is produced by the electric engine E1/E2 only and takes on the value needed for satisfying the wheel torque.

The torque calculation stage can have a fourth characteristic curve stage, in which at least one torque/rotational speed characteristic curve of an electric engine E1/E2 is stored. From the actual rotational speed value, the possible output torque of the electric engine is determined, optionally taking into account the comparison of desired and actual rotational speed of the electric engine and the inertia thereof. The torque calculation stage can also have a second torque limitation stage, which limits the desired torques of the electric engine E1/E2 to the values established in the fourth characteristic curve stage.

Figure 7:
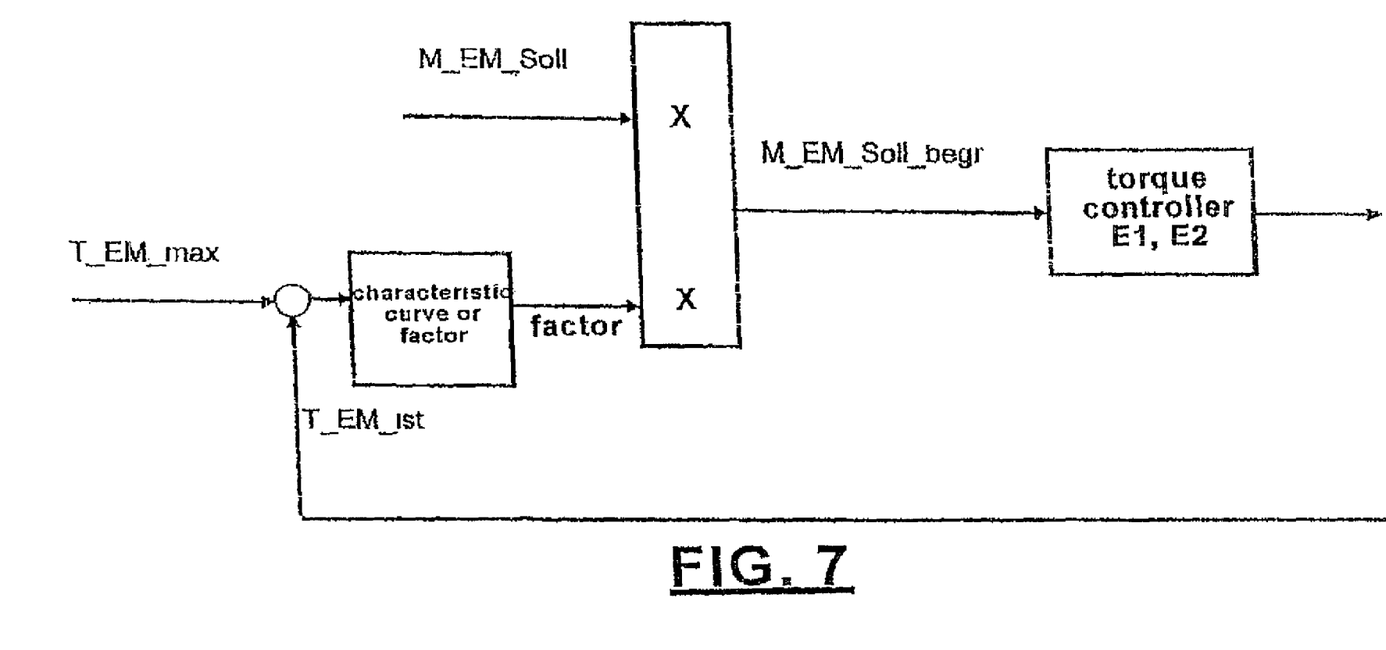
FIG. 7 shows a connection diagram for the limitation of the desired torque of an electric engine in the apparatuses according to FIGS. 1 to 3.

The torque calculation stage can have a fifth characteristic curve stage, in which at least one temperature/power loss characteristic curve of the electric engine is stored. From the actual electric motor temperature value of the electric engine, the permitted power loss is determined. With respect to this feature, reference is made to FIG. 7. Here, a comparison between the measured temperature of the electric engine T-EM-ist and the maximum temperature T-EM-max is performed. In a characteristic curve block or in a factor block, respectively, a factor is determined, by which the desired moment M-EM-Soll of the electric engine is multiplied. It shall be understood that the same is always <1. Thus, a limited desired value M-EM-Soll-begr results as a desired value presetting for the torque controller of the electric engine E1 or E2, respectively.

Figure 5:
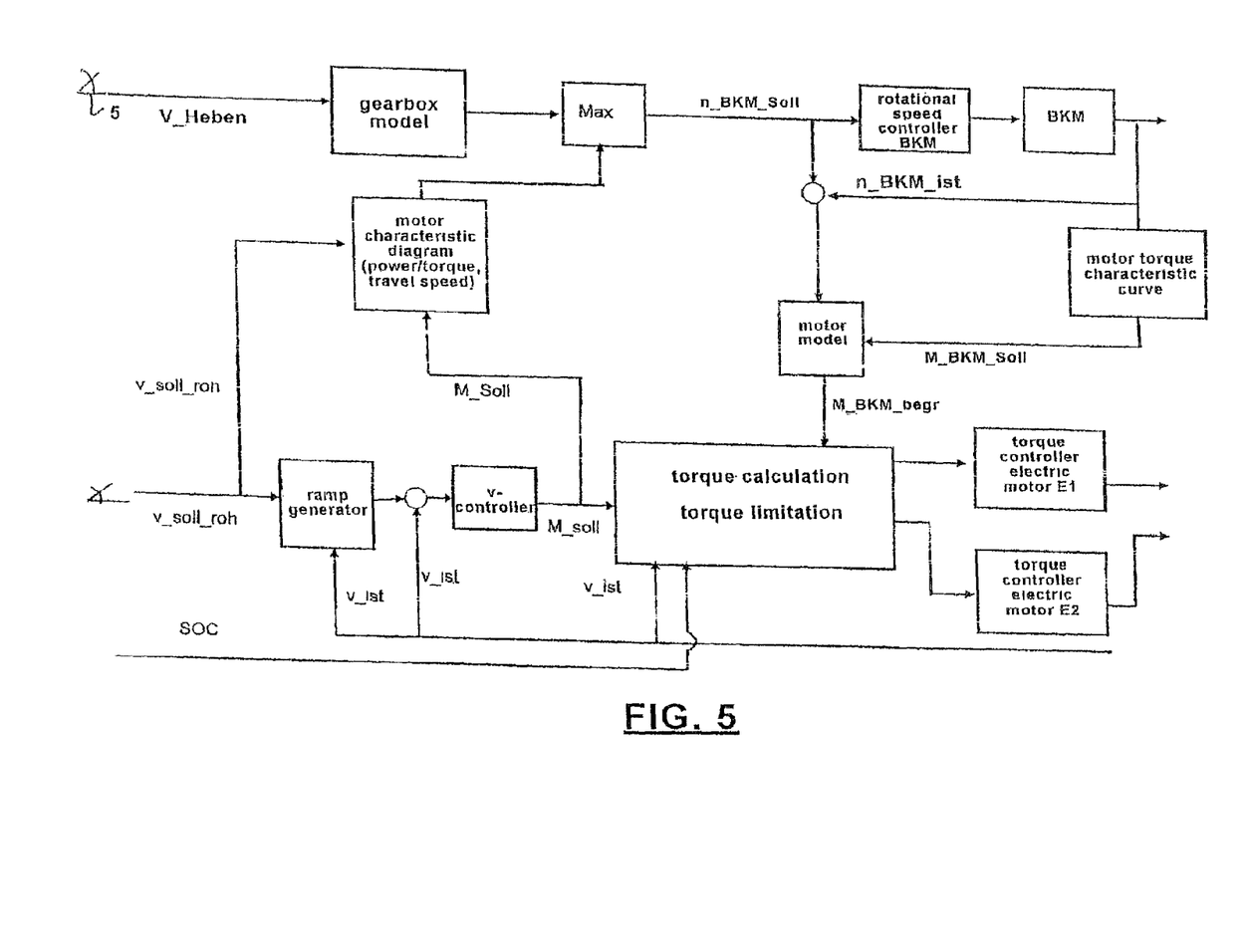
FIG. 5 shows a control scheme for the operation of the embodiments according to FIGS. 1 to 3 which is modified with respect to FIG. 4.

It is possible to couple at least one pump to such a drive system for an industrial truck, by which hydraulic drives are supplied. This is indicated in FIG. 5. With an additional desired value transmitter 11, a desired value is preset, for a lifting function in an industrial truck for instance. Even here, the speed V-Heben is preset. In a gearbox model, a desired value is generated there from. In a stage Max, this desired value is compared with that desired value which is established in the torque calculation stage and is converted to a desired rotational speed in the set of motor characteristic curves. In the maximum value stage Max, the greater one of the two rotational speed desired values (travelling function and working function) is determined and is forwarded to the controlling device for the rotational speed of the internal combustion engine. For the rest, the function of the drive system of FIG. 5 is similar to that of FIG. 4.

A mode of operation change stage for bridging the superimposition operation can also be controlled by a controlling and regulating device, which controls the switching elements of the bridging apparatus. It can be dimensioned for the releasing and closure of clutches and brakes. A further controlling and regulating device can control the actuation of the switching elements of the clutches and/or brakes. The mode of operation change stage can switch the drive system into a series operation through the actuation of clutches and brakes, in which the power generated by the internal combustion engine BKM is transmitted in a purely electric manner from the first electric motor E1, which works as a generator, to the second electric engine E2, which works as a travelling motor.

The mode of operation change stage can switch the drive system into a power-branched operation through the actuation of clutches and brakes, in which a part of the power generated by the internal combustion engine BKM is electrically transmitted from the first electric engine E1, which works as a generator or as a motor, to the second electric engine, which works as a motor or a generator, and the other part of the power is mechanically transmitted to the gearbox shafts for take-off. The mode of operation change stage can switch the drive system into a parallel operation through the actuation of clutches and brakes, in which the power generated by the internal combustion engine BKM and by at least one electric engine sum up. The mode of operation change stage can switch the drive system into a purely electric operation through the actuation of clutches and brakes, in which the internal combustion engine is cut off. The various modes of operation can be realised via different controllers, characteristic curve stages and torque calculation stages.

The shown drive system can also have an operation strategy stage, which determines the most advantageous mode of operation for the respective operating state from certain input signals and/or characteristic curves and drives the subsequent mode of operation change stage.

The operation strategy stage can detect and compare the energy consumption in the individual modes of operation and it can generate desired value signals for the mode of operation change stage, in order to change over into the most favourable mode of operation, wherein hystereses are provided in order to avoid pendulum circuits.

The mode of operation change stage can compare state variables of the drive system with changeover conditions and it can send presettings to the controlling or regulating elements of the control elements of the gearboxes, the clutches and the bridging device.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for controlling a hybrid drive system for a motor vehicle, with an internal combustion engine BKM, an accumulator for electric energy, an apparatus for acquiring the charge condition SOC of the accumulator, at least one electric engine E1/E2, which is connectable to the electric accumulator, and at least one gearbox arrangement, via which the internal combustion engine BKM, the electric engine E1/E2 and at least one wheel of the vehicle can be coupled to each other, the apparatus comprising:
 a desired value transmitter for a travelling speed v, which presets a desired-signal for the desired travelling speed;
 an actual value transmitter for the travelling speed v, which generates an actual-signal from the travelling speed;
 a first controlling device for the travelling speed v, in which the desired value for the travelling speed is compared with the actual value of the travelling speed, and a speed controller which establishes a desired driving torque M-soll;
 a torque calculation stage, topped by the first controlling device, which establishes the desired torque values for the internal combustion engine BKM as well as the desired values for the electric engine E1/E2 from the desired driving torque M-soll or a signal corresponding to the same, kinematic conditions of the gearbox arrangement and the actual rotational speed of the electric engine E1/E2 needed for this;
 a first characteristic curve stage with at least one characteristic curve, which associates approximately optimum rotational speeds to the desired torque values of the internal combustion engine and which presets a desired-signal for the rotational speed of the internal combustion engine;
 a second controlling device, with a comparison of the desired and the actual values for the internal combustion engine BKM, which drives the internal combustion engine BKM such that the deviations become sufficiently small, and
 a third controlling device with a comparison of the desired and the actual values of the torques and currents, respectively, of the electric engine E/1/E2, which drives the electric engine E/1/E2 such that the deviations become sufficiently small.

2. An apparatus according to claim 1, characterised in that the first characteristic curve stage has at least one further characteristic curve, which assigns desired rotational speeds of the internal combustion engine BKM to the desired values of the travelling speed, wherein the desired rotational speed values for the internal combustion engine BKM determined from the individual characteristic curves are linked with each other in order to establish a definite desired rotational speed value for the internal combustion engine BKM.

3. An apparatus according to claim 1, characterised in that the first characteristic curve stage includes at least one characteristic diagram, which assigns approximately optimum rotational speeds to value-pairs of travel speed desired values and torque desired values of the internal combustion engine BKM, in order to create a desired-signal for the rotational speed of the internal combustion engine BKM.

4. An apparatus according to claim 1, characterised in that a limiting stage is connected between the desired value transmitter and the first controlling device, for a change of the travelling speed desired value v-soll-roh and/or for limitation to adjustable or preset values, respectively (ramp generator).

5. An apparatus according to claim 1, characterised in that a second characteristic curve stage is provided, in which at least one torque/rotational speed characteristic curve of the internal combustion engine BKM is stored for establishing a possible output torque of the internal combustion engine from the rotational speed actual value of the internal combustion engine.

6. An apparatus according to claim 1, characterised in that the first and a second characteristic curve stage includes a switch-over for switching over between the characteristic curves and further characterised in that the switch-over takes place by manual presetting or by the travelling speed signal of the desired value transmitter (4) and/or the actuation speed thereof.

7. An apparatus according to claim 1, characterised in that the torque calculation stage has at least one substage, in which the desired torque for the electric engine E1/E2 is established and/or limited, which is connected to a constrained system cross gear set (2.1, 2.2) or to a bridged superimposition gear, by establishing the desired torque of the electric engine E1/E2 such that the output torque of the gearbox takes the value necessary to satisfy the wheel torque, wherein the possible output torque of the internal combustion engine BKM is taken into account, which is established in a second characteristic curve stage and further characterised in that a second characteristic curve stage is provided, in which at least one torque/rotational speed characteristic curve of the internal combustion engine BKM is stored for establishing a possible output torque of the internal combustion engine from the rotational speed actual value of the internal combustion engine.

8. An apparatus according to claim 1, characterised in that the torque calculation stage has at least one substage, in which the desired torque is established and/or limited for the electric engine E1/E2, which is connected to an superimposition gear, wherein the desired torque of the electric engine E1/E2 is established such that the internal combustion engine BKM, connected to the gearbox input, is loaded only up to the possible output torque of the BKM, which is established in the second characteristic curve stage and further characterised in that a second characteristic curve stage is provided, in which at least one torque/rotational speed characteristic curve of the internal combustion engine BKM is stored for establishing a possible output torque of the internal combustion engine from the rotational speed actual value of the internal combustion engine.

9. An apparatus according to claim 1, characterised in that the torque calculation stage has at least one substage, in which the desired torque for one electric engine E1/E2 is established and/or limited, which is connected to a constrained system cross gear set or a bridged superimposition gear, by determining the desired torque of the electric engine E1/E2 such that the entire output torque of the gearbox is generated by the electric engine E1/E2 only and takes on the value necessary to satisfy the wheel torque.

10. An apparatus according to claim 1, characterised in that a third characteristic curve stage generates a signal for the permitted charging or discharging power of the electric accumulator from the charging condition SOC of the electric accumulator and further characterised in that the charging- and discharging power signal of the electric accumulator is input into the torque calculation stage.

11. An apparatus according to claim 1, characterised in that in a fourth characteristic curve stage at least one torque/rotational speed characteristic curve for an electric engine E1/E2 is stored, and that the possible output torque of the electric engine is established from the actual value of the rotational speed of the electric engine E1/E2, and further characterised in that the torque calculation stage has a second torque limitation stage, which limits the desired torque values of the electric engine E1/E2 to the values established in the fourth characteristic curve stage.

12. An apparatus according to claim 1, characterised in that the torque calculation stage has a fifth torque limitation stage, in which at least one temperature/power loss characteristic curve of the electric engine E1/E2 is stored and a permitted power loss is established from a actual electromotor temperature value of the electric engine E1/E2.

13. An apparatus according to claim 12, characterised in that the torque calculation stage has a sixth characteristic curve stage, in which at least one torque/rotational speed/power loss diagram of the electric engine E1/E2 is stored and the permitted torque of the electric engine E1/E2 is established from the actual rotational speed value and the permitted power loss, determined in the fifth characteristic curve stage and further characterised in that in the second torque limitation stage, the desired torque values of the electric engine E1/E2 are limited to the values determined in the sixth characteristic curve stage.

14. An apparatus according to claim 1, characterised in that the first characteristic curve stage establishes desired rotational speeds for a first or second electric engine E1/E2, the torque of the internal combustion engine BKM is controlled in the second controlling device and the rotational speed of the one as well as the torque of the other electric engine E1/E2 is controlled in the third controlling device.

15. An apparatus according to claim 1, characterised in that an apparatus for measuring the charging condition of the electric accumulator is provided, for measuring the off-load voltage and further characterised in that an apparatus for the equalisation of the calculated charging condition with the measured charging condition is provided.

16. An apparatus according to claim 1, characterised in that a fourth controlling device controls the actuation of switching elements of a changeover or variable speed gearbox (1) and further characterised in that the mode of operation changing stage is dimensioned for releasing or closing of clutches and brakes, respectively and a sixth controlling and regulating device controls the actuation of changing elements of the clutches and brakes.

17. An apparatus according to claim 1, characterised in that a mode of operation changing stage for bridging the superimposition gear is provided and a fifth controlling or regulating device controls the actuation of switching elements of a bridging apparatus.

18. An apparatus according to claim 17, characterised in that the mode of operation changing stage switches the drive system into a series operation by actuation of clutches and brakes, in which the power generated by the internal combustion engine BKM is transmitted in a purely electric manner from the first electric engine, which works as a generator, to the second electric engine, which works as a travelling motor.

19. An apparatus according to claim 17, characterised in that the at least one electric engine E1/E2 comprises a first electric engine E1 and a second electric engine E2 and the mode of operation changing stage switches the drive system into a power-branched operation through the actuation of clutches and brakes, in which a part of the power generated by the internal combustion engine BKM is transferred from the first electric engine, which works as a generator or motor, respectively, to the second electric engine, which works as a motor or generator, and the other part of the power is mechanically transferred to the gearbox shafts to the driven shaft (5).

20. An apparatus according to claim 17, characterised in that the mode of operation changing stage of the drive system changes over into a parallel operation through the actuation of clutches and brakes, in which the powers generated by the internal combustion engine BKM and by the at least one electric engine E1/E2 sum up.

21. An apparatus according to claim 17, characterised in that the mode of operation changing stage of the drive system changes over into a purely electric operation through the actuation of clutches and brakes, in which the internal combustion engine BKM is cut off.

22. An apparatus according to claim 17, characterised in that an operation strategy stage is provided, which determines a most advantageous mode of operation for the actual operating state from input signals and drives the subsequent mode of operation changing stage and further characterised in that state quantities of the drive system are compared with change-over conditions and presets are sent to the controlling and regulating devices of at least one gearbox, at least one clutch and a bridging device.

23. An apparatus according to claim 22, characterised in that the operation strategy stage detects and compares an energy consumption in an individual mode of operation and generates desired-signals for the mode of operation changing stage in order to change over into the mode of operation most favourable with respect to consumption, wherein hystereses are provided in order to avoid pendulum circuits.

24. An apparatus according to claim 22, characterised in that the operation strategy stage decides whether the accumulator is charged or discharged, based on the mode of operation and the charging condition SOC of the accumulator according to the characteristic curves of a third characteristic curve stage.

25. An apparatus according to claim 1, characterised in that pumps are provided which are attached on different gearbox shafts, wherein from the signal obtained from an operational control for presetting the desired speed of a working function (the lifting speed, for instance), the desired rotational speed value for the internal combustion engine BKM is established in a calculation stage with the kinematic conditions of the gearbox and the actual rotational numbers of the at least one electric motor and further characterised in that in a maximum value stage, the greater one of the two desired rotational speed values (travelling function and working function) is established and is forwarded to the control device for the rotational speed of the internal combustion engine BKM.

26. An apparatus for controlling a hybrid drive system for a motor vehicle, with an internal combustion engine BKM, an accumulator for electric energy, an apparatus for acquiring the charge condition SOC of the accumulator, at least one electric engine E1/E2, which is connectable to the electric accumulator, and at least one gearbox arrangement, via which the internal combustion engine BKM, the electric engine E1/E2 and at least one wheel of the vehicle can be coupled to each other, the apparatus comprising:

a desired value transmitter for a travelling speed v, which presets a desired-signal for the desired travelling speed;

an actual value transmitter for the travelling speed v, which generates an actual-signal from the travelling speed;

a first controlling device for the travelling speed v, in which the desired value for the travelling speed is compared with the actual value of the travelling speed, and a speed controller which establishes a desired driving torque M-soll;

a torque calculation stage, topped by the first controlling device, which establishes the desired torque values for the internal combustion engine BKM as well as the desired values for the electric engine E1/E2 from the desired driving torque M-soll or a signal corresponding to the same, kinematic conditions of the gearbox arrangement and the actual rotational speed of the electric engine E1/E2 needed for this;

a first characteristic curve stage with at least one characteristic curve, which associates approximately optimum rotational speeds to the desired torque values of the internal combustion engine and which presets a desired-signal for the rotational speed of the internal combustion engine;

a second controlling device, with a comparison of the desired and the actual values for the internal combustion engine BKM, which drives the internal combustion engine BKM such that the deviations become sufficiently small;

a third controlling device with a comparison of the desired and the actual values of the torques and currents, respectively, of the electric engine E/1/E2, which drives the electric engine E/1/E2 such that the deviations become sufficiently small;

further characterised in that the gearbox arrangement has at least one changeover or variable speed gearbox (2), the input of which is coupled with the driven shaft of the internal combustion engine BKM and the output of which is coupled with the driven shaft (5), and that at least one first cross gear set (1) is provided, the inputs of which are coupled with the driven shaft of the changeover or variable speed gearbox (2) and the driven shaft of the electric engine E1, and the output of which is coupled with the driven shaft (5) of the drive system.

27. An apparatus according to claim 26, characterised in that said at least one electric engine E1/E2 is a hollow shaft electric engine that is directly connected to a gearbox shaft.

28. An apparatus for controlling a hybrid drive system for a motor vehicle, with an internal combustion engine BKM, an accumulator for electric energy, an apparatus for acquiring the charge condition SOC of the accumulator, at least one electric engine E1/E2, which is connectable to the electric accumulator, and at least one gearbox arrangement, via which the internal combustion engine BKM, the electric engine E1/E2 and at least one wheel of the vehicle can be coupled to each other, the apparatus comprising:

a desired value transmitter for a travelling speed v, which presets a desired-signal for the desired travelling speed;

an actual value transmitter for the travelling speed v, which generates an actual-signal from the travelling speed;

a first controlling device for the travelling speed v, in which the desired value for the travelling speed is compared with the actual value of the travelling speed, and a speed controller which establishes a desired driving torque M-soll;

a torque calculation stage, topped by the first controlling device, which establishes the desired torque values for the internal combustion engine BKM as well as the desired values for the electric engine E1/E2 from the desired driving torque M-soll or a signal corresponding to the same, kinematic conditions of the gearbox arrangement and the actual rotational speed of the electric engine E1/E2 needed for this;

a first characteristic curve stage with at least one characteristic curve, which associates approximately optimum rotational speeds to the desired torque values of the internal combustion engine and which presets a desired-signal for the rotational speed of the internal combustion engine;

a second controlling device, with a comparison of the desired and the actual values for the internal combustion engine BKM, which drives the internal combustion engine BKM such that the deviations become sufficiently small;

a third controlling device with a comparison of the desired and the actual values of the torques and currents, respectively, of the electric engine E/1/E2, which drives the electric engine E/1/E2 such that the deviations become sufficiently small;

further characterised in that the gearbox arrangement has at least one first cross gear set (2), the inputs of which are coupled with the driven shaft of the internal combustion engine BKM and the driven shaft of the electric engine E1, and the output of which is coupled with the driven shaft (5) of the drive system, and which has at least one changeover or variable speed gearbox (1) in the train of the driven shaft (5).

29. An apparatus for controlling a hybrid drive system for a motor vehicle, with an internal combustion engine BKM, an accumulator for electric energy, an apparatus for acquiring the charge condition SOC of the accumulator, at least one electric engine E1/E2, which is connectable to the electric accumulator, and at least one gearbox arrangement, via which the internal combustion engine BKM, the electric engine E1/E2 and at least one wheel of the vehicle can be coupled to each other, the apparatus comprising:

a desired value transmitter for a travelling speed v, which presets a desired-signal for the desired travelling speed;

an actual value transmitter for the travelling speed v, which generates an actual-signal from the travelling speed;

a first controlling device for the travelling speed v, in which the desired value for the travelling speed is compared with the actual value of the travelling speed, and a speed controller which establishes a desired driving torque M-soll;

a torque calculation stage, topped by the first controlling device, which establishes the desired torque values for the internal combustion engine BKM as well as the desired values for the electric engine E1/E2 from the desired driving torque M-soll or a signal corresponding to the same, kinematic conditions of the gearbox arrangement and the actual rotational speed of the electric engine E1/E2 needed for this;

a first characteristic curve stage with at least one characteristic curve, which associates approximately optimum rotational speeds to the desired torque values of the internal combustion engine and which presets a desired-signal for the rotational speed of the internal combustion engine;

a second controlling device, with a comparison of the desired and the actual values for the internal combustion engine BKM, which drives the internal combustion engine BKM such that the deviations become sufficiently small;

a third controlling device with a comparison of the desired and the actual values of the torques and currents, respectively, of the electric engine E/1/E2, which drives the electric engine E/1/E2 such that the deviations become sufficiently small;

further characterised in that the gearbox arrangement has at least one first cross gear set (2.1), the inputs of which are coupled with the driven shaft of the internal combustion engine BKM and the driven shaft of a first electric engine E1, and the output of which is coupled with the driven shaft (5) of the drive system, and that it has at least one changeover or variable speed gearbox (1), the input of which is coupled with the driven shaft of the first cross gear set (2.1) and that it has a second cross gear set (2.2), the inputs of which are coupled with the driven shaft of the changeover or variable speed gearbox (1) and the driven shaft of a second electric engine E2, and the output of which is coupled with the driven shaft (5) of the system.

30. An apparatus according to claim 29, characterised in that the torque calculation stage has at least one substage, in which the desired torques of the first electric engine E1, connected to the first constrained system cross gear set (2.1) or bridged superimposition gear, and of the second electric engine E2, connected to the second constrained system cross gear set (2.2), are established and/or limited, when the changeover or variable speed gearbox (1), arranged between the cross gear sets (2.1, 2.2) is switched into the neutral position, wherein the electric power generated by the first electric engine E1 in a generator mode is consumed in a series mode by the second electric engine E2, and the internal combustion engine BKM connected to the first cross gear set (2.1) is loaded only up to the possible output torque of the internal combustion engine BKM, which is established in a second characteristic curve stage and further characterised in that the second characteristic curve stage is provided, in which at least one torque/rotational speed characteristic curve of the internal combustion engine BKM is stored for establishing a possible output torque of the internal combustion engine from the rotational speed actual value of the internal combustion engine.

* * * * *